United States Patent
Greenblatt

(10) Patent No.: US 8,708,651 B2
(45) Date of Patent: Apr. 29, 2014

(54) AERODYNAMIC PERFORMANCE ENHANCEMENTS USING DISCHARGE PLASMA ACTUATORS

(76) Inventor: David Greenblatt, Haifa (IL)

(*) Notice: Subject to any disclaimer, the term of this patent is extended or adjusted under 35 U.S.C. 154(b) by 877 days.

(21) Appl. No.: 12/739,825

(22) PCT Filed: Oct. 26, 2008

(86) PCT No.: PCT/IL2008/001407
§ 371 (c)(1),
(2), (4) Date: Sep. 2, 2010

(87) PCT Pub. No.: WO2009/053984
PCT Pub. Date: Apr. 30, 2009

(65) Prior Publication Data
US 2010/0329838 A1  Dec. 30, 2010

Related U.S. Application Data

(60) Provisional application No. 60/982,804, filed on Oct. 26, 2007.

(51) Int. Cl.
*B64C 11/18* (2006.01)
*F04D 29/38* (2006.01)

(52) U.S. Cl.
USPC ............ 416/24; 416/189; 416/61; 416/146 R; 416/185

(58) Field of Classification Search
USPC ......... 416/23, 24, 61, 146 R, 185, 189, 169 A
See application file for complete search history.

(56) References Cited

U.S. PATENT DOCUMENTS

| | | | | |
|---|---|---|---|---|
| 3,006,534 A | * | 10/1961 | McDonald | 416/186 R |
| 4,737,885 A | * | 4/1988 | Akutsu | 361/225 |
| 5,624,234 A | * | 4/1997 | Neely et al. | 416/238 |
| 6,817,835 B2 | * | 11/2004 | Boyd et al. | 416/210 R |
| 6,932,569 B2 | * | 8/2005 | Torok et al. | 416/1 |
| 7,624,941 B1 | * | 12/2009 | Patel et al. | 244/3.22 |
| 7,736,123 B2 | * | 6/2010 | Lee et al. | 415/1 |
| 8,083,961 B2 | * | 12/2011 | Chen et al. | 216/61 |
| 2002/0195089 A1 | | 12/2002 | Zetmeir | |
| 2004/0011917 A1 | | 1/2004 | Saeks | |
| 2004/0118973 A1 | | 6/2004 | Malmuth | |
| 2004/0195462 A1 | | 10/2004 | Malmuth | |
| 2008/0067283 A1 | * | 3/2008 | Thomas | 244/1 N |
| 2008/0149205 A1 | | 6/2008 | Gupta | |
| 2009/0097976 A1 | * | 4/2009 | Driver et al. | 416/42 |

FOREIGN PATENT DOCUMENTS

| | | |
|---|---|---|
| EP | 1672966 A2 | 6/2006 |
| WO | 99/35893 A2 | 7/1999 |
| WO | 2007/106863 A2 | 9/2007 |
| WO | 2007/133239 A2 | 11/2007 |

OTHER PUBLICATIONS

International Search Report of PCT/IL2008/001407 dated mailed Feb. 9, 2009.

* cited by examiner

*Primary Examiner* — Ninh H Nguyen
(74) *Attorney, Agent, or Firm* — Browdy and Neimark, PLLC

(57) ABSTRACT

The current invention provides significant performance improvements or significant energy savings for fans used in these applications: personal, industrial and automotive cooling, ventilation, vacuuming and dust removal, inflating, computer component cooling, propulsors for unmanned and manned air vehicles, propulsors for airboats, air-cushion vehicles, airships and model aircraft. Additionally, the invention provides higher performance such as higher lift and higher lift efficiency to small air vehicles. These advantages are achieved by using plasma actuators to provide active flow control effectors into thin fan blades and wing.

24 Claims, 8 Drawing Sheets

AERODYNAMIC PERFORMANCE ENHANCEMENTS USING DISCHARGE PLASMA ACTUATORS

FIELD OF THE INVENTION

The present invention relates to enhancing aerodynamic performance by using plasma actuators to control air flow. The invention has specific application to fan and ducted-fan performance and flow control at low Reynolds and intermediate numbers. Dielectric barrier discharge plasma actuators are preferably used.

BACKGROUND OF THE INVENTION

Reynolds number (Re) is a dimensionless number that gives a measure of the ratio of inertial forces (V/ρ) to viscous forces (μ/L) and, consequently, it quantifies the relative importance of these two types of forces for given flow conditions.

Reynolds numbers frequently arise when performing dimensional analysis of fluid dynamics and heat transfer problems, and as such can be used to determine dynamic similitude between different experimental cases. They are also used to characterize different flow regimes, such as laminar or turbulent flow: laminar flow occurs at low Reynolds numbers, where viscous forces are dominant, and is characterized by smooth, constant fluid motion, while turbulent flow occurs at high Reynolds numbers and is dominated by inertial forces, which tend to produce random eddies, vortices and other flow fluctuations.

Reynolds number is generally defined as: $Re = \rho VL/\mu$ where: V is the mean fluid velocity in (SI units: m/s); L is the characteristic length of the structure (m); μ is the dynamic viscosity of the fluid (Pa·s or N·s/m$^2$); and ρ is the density of the fluid (kg/m$^3$)

For any shape, the parameter that is used as the characteristic length L is not given explicitly by physics, but rather is chosen by convention (and usually subscripted after the 'Re').

In boundary layer flow over a flat plate, experiments can confirm that, after a certain length of flow, a laminar boundary layer will become unstable and become turbulent. This instability occurs across different scales and with different fluids, usually when $Re_x \sim 5 \cdot 10^5$, where x is the distance from the leading edge of the flat plate, and the flow velocity is the 'free stream' velocity of the fluid outside the boundary layer. In conventional aerodynamics, the following approximate ranges apply for Reynolds number:

Extremely low: $1,000 \leq Re \leq 20,000$
 Very low: $20,000 < Re \leq 200,000$
 Conventional low: $200,000 < Re \leq 1,000,000$
 Intermediate: $1,000,000 < Re \leq 5,000,000$
 High: $Re > 5,000,000$ Fans are widely used for personal, industrial and automotive cooling, ventilation, vacuuming and dust removal, inflating, etc. Ducted, or shrouded, fans have for many years been used for propulsion of airboats, air-cushion vehicles, airships and model aircraft. They are also touted as the primarily propulsive system for so-called personal air vehicles, a number of which are under intense development (e.g. White, 2006; and Yoeli, 2002). Their main advantages are high static thrust and propulsion efficiency, while the duct acts to reduce blade noise and improve safety. The main factor limiting the performance of these blades is boundary layer separation, where the flow detaches from the blade surface. This leads to dramatic losses in performance and severe increases in noise and vibrations. The typical Reynolds number range is conventional low to intermediate.

In recent years, ducted fans have received renewed attention, particularly for the propulsion of small-scale (typically ~500 mm) unmanned air vehicles (Fleming et al, 2003; Guerrero et al, 2003). In addition, there is a trend toward the design of even smaller air vehicles, known as "micro air vehicles" (MAVs; maximum dimension typically between 7.5 cm and 15 cm), for a variety of military and civil applications. One consequence of these smaller scales and relatively low tip speeds is a reduced fan blade Reynolds number, typically less than 50,000. At these Reynolds numbers, boundary layer transition does not occur and the boundary layer is susceptible to separation, which can result in a catastrophic loss of propulsion. The best performing blade profiles are thin, curved sections which do not produce a large pressure ΔP across the disk since leading-edge separation occurs at relatively low inflow angles.

A rapidly growing application of fans and ducted fans is their ubiquitous use for the cooling of modern high-speed computer systems at large scales and also at small scales such as on computer chips, motherboards and power supplies. Large scale server farms, which are collections or clusters of computer servers, are increasingly being used instead of mainframe computers by large enterprises. The performance server farms (typically thousands or tens of thousands of processors) are typically limited by the performance of the cooling systems. At the small scales, typically, a fan blows air across a heat-sink that is attached to a particular component, such as a CPU. In modern designs, fan speed can be controlled based on a feedback principle and this is generally referred to as active cooling. However, modern high-speed processors require continuously greater cooling and this is generally accomplished using larger heat sinks and more powerful fans running at higher rpm. Apart from physical size limitations, these fans are increasing noisy and require greater input power. In fact, the noise generated by fans that are used to cool high-end processors, particularly within a small physical computer sizes, is often objectionable to the user.

The above mentioned problems were negotiated by designing more efficient blade sections, but this optimization process has now reached its limit.

Achieving sustained flight of micro air vehicles (MAVs) brings significant challenges due to their small dimensions and low flight speeds. For so-called mini air vehicles, which operate in the $10,000 < Re < 300,000$ range, efficient systems can be designed by managing boundary-layer transition via passive tripping at multiple locations. However, at Reynolds numbers routinely experienced by MAVs (Re<100,000), conventional low-Reynolds-number airfoils perform poorly or generate no useful lift. Some of the best-performing airfoils in this Re range are cambered flat plates and airfoils with a thickness-to-chord ratio of approximately 5%. There are various definitions for MAV dimensions and weight, although one common definition refers to large (b~15 cm and m~90 g) and small (b~8 cm and m~30 g) MAVs. To maximize wing area, these vehicles typically have low-aspect-ratio (AR) wings (1<AR<2) for which typical Reynolds numbers during loiter are in the range of $20,000 < Re < 80,000$, based on the aforementioned specifications. Innovative designs with larger-aspect-ratio wings can result in an even lower Reynolds number range.

The challenge of developing useful lift intensifies with yet smaller vehicles required to fly at even lower flight speeds. This includes the development of so-called nano Unmanned air Vehicles (UAVs) for which the missions include flying within confined areas. These are commonly termed Nano Air Vehicles (NAVs) and are defined as weighing less than 10 g, with dimensions smaller than 7:5 cm, and speeds between 0.5 and 7:5 m/s.

The significant difficulty associated with generating lift at Re<20,000 has led many to pursue biologically inspired approaches in which the flight of small birds and insects is mimicked to a greater or lesser degree.

It is well known that a fan (or wind pump) can also be used as a turbine. The most common of these is the horizontal axis (axial flow) wind turbine, where wind turns the turbine blades that, in turn, drive a generator.

Patent application WO07106863A; titled "Methods and apparatus for reducing noise via a plasma fairing"; to Thomas Flint; discloses a plasma fairing for reducing noise generated by, for example, an aircraft landing gear is disclosed. The plasma fairing includes at least one plasma generating device, such as a single dielectric barrier discharge plasma actuator, coupled to a body, such as an aircraft landing gear, and a power supply electrically coupled to the plasma generating device. When energized, the plasma generating device generates plasma within a fluid flow and reduces body flow separation of the fluid flow over the surface of the body.

US application 20020195089A; titled "Self contained air flow and ionization method, apparatus and design for internal combustion engines" to Zetmeir Karl; disclosed method to enhance the performance of internal combustion engines by the creation of a swirling vortex, using principles of electrostatics in using tribology and coulomb forces, the utilization of dielectric properties of polymers in an air driven rotating electrophorus and the chemistry of enhanced combustion gases and combustion itself in a single self-contained apparatus and does so without the convention and application of external voltage US application 20040195462; titled "Surface plasma discharge for controlling leading edge contamination and crossflow instabilities for laminar flow"; to Fedorov Alexander and Malmuth Norman; discloses a system and method for controlling leading edge contamination and crossflow instabilities for laminar flow on aircraft airfoils that is lightweight, low power, economical and reliable. Plasma surface discharges supply volumetric heating of the supersonic boundary layers to control the Poll Reynolds number and the cross flow Reynolds number and delay transition to turbulent flow associated with the leading edge contamination and crossflow instabilities.

US application 20040118973; titled "Surface plasma discharge for controlling forebody vortex asymmetry" to Federov Alexander et. al.; discloses a system and method for rapidly and precisely controlling vortex symmetry or asymmetry on aircraft forebodies to avoid yaw departure or provide supplemental lateral control beyond that available from the vertical tail surfaces with much less power, obtrusion, weight and mechanical complexity than current techniques. This is accomplished with a plasma discharge to manipulate the boundary layer and the angular locations of its separation points in cross flow planes to control the symmetry or asymmetry of the vortex pattern.

GENERAL BACKGROUND INFORMATION MAY BE FOUND IN THE FOLLOWING REFERENCES

1. Carr, L. W., "Progress in the analysis and prediction of dynamic stall" AIAA Journal of Aircraft, Vol. 25, No. 1, 1988, pp. 6-17.
2. Corke, T. C. He C. and Patel, M. P., "Plasma flaps and slats: An application of weakly ionized plasma actuators," AAIA Paper 2004-2127, 2nd AIAA Flow Control Conference, Portland, Oreg., 2004.
3. Fleming, J., Jones, T., Ng, W., Gelhausen, P. and Enns, D., "Improving Control System Effectiveness for Ducted Fan VTOL UAVs Operating in Crosswinds," AIAA Paper 2003-6514, $2^{nd}$ AIAA "Unmanned Unlimited" Conference and Workshop and Exhibit, San Diego, Calif., Sep. 15-18, 2003.
4. Göksel, B. Greenblatt, D., Rechenberg I., Nayeri, C. N. and Paschereit, C. O., "Steady and Unsteady Plasma Wall Jets for Separation and Circulation Control," AIAA Paper 2006-3686, 3rd AIAA Flow Control Conference, San Francisco, Calif., 5-8 Jun. 2006.
5. Göksel, B., Greenblatt, D., Rechenberg, I. Kastantin, Y., Nayeri, C. N. and Paschereit, C. O., "Pulsed plasma actuators for active flow control at MAY Reynolds Numbers," *Notes on Numerical Fluid Mechanics and Multidisciplinary Design*, Vol. 95, pp. 42-55, 2007.
6. Greenblatt D. and Wygnanski, I., "Use of Periodic Excitation to Enhance Airfoil Performance at Low Reynolds Numbers," *AIAA Journal of Aircraft*, Volume 38, Issue 1, 2001, pp. 190-192.
7. Greenblatt, D and Wygnanski, I., "The control of separation by periodic excitation," Progress in Aerospace Sciences, Volume 37, Issue 7, 2000, pp. 487-545.
8. Greenblatt, D. and Wygnanski, I., "Effect of leading-edge curvature on airfoil separation control," *AIAA Journal of Aircraft*, Vol. 40, No. 3, 2002, pp. 473-481.
9. Greenblatt, D., Göksel, B. Schüle, C. Y. and Paschereit, C. O., "Dielectric Barrier Discharge Flow Control at Very Low Flight Reynolds Numbers," $47^{th}$ Israel Annual Conference on Aerospace Sciences, Dan Panorama Hotel, Tel Aviv and Technion Campus, Haifa, Feb. 21-22, 2007.
10. Greenblatt, D., "Dual Location Separation Control on a Semispan Wing," AIAA Journal, Vol. 45, No. 8, 2007, pp. 1848-1860.
11. Guerrero, I., Londenberg, W., Gelhausen, P. and Myklebust, A., "A Powered Lift Aerodynamic Analysis for the Design of Ducted Fan UAVs," AIAA Paper 2003-6567, $2^{nd}$ AIAA "Unmanned Unlimited" Conference and Workshop and Exhibit, San Diego, Calif., Sep. 15-18, 2003.
12. Poisson-Quinton, Ph. and Lepage, L., "Survey of French research on the control of boundary layer and circulation," in Lachmann, G. V., "Boundary layer and Flow Control. Its Principles and Application", Volume 1, Pergamon Press, New York, 1961, pp. 21-73.
13. Roth, J. R. and Dai, X. (2006) Optimization of the Aerodynamic Plasma Actuator as an Electrohydrodynamic (EHD) Electrical Device. AIAA Paper 2006-1203, 44th AIAA Aerospace Sciences Meeting and Exhibit, Reno, Nev.
14. Seifert, A., Darabi, A. and Wygnanski, I., "Delay of airfoil stall by periodic excitation", AIAA Journal of Aircraft, Vol. 33, No. 4, 1996, pp. 691-698.
15. Shyy, W., Berg, M. and Ljungqvist, D., "Flapping and Flexible Wings for Biological and Micro Air Vehicles", Progress in Aerospace Sciences, Vol. 35, Issue 5, 1999, pp. 455-505.
16. Mueller T. J., "Aerodynamic Measurements at Low Reynolds Numbers for Fixed Wing Micro-Air Vehicles," Presented at the RTO AVT/VKI Special Course on Development and Operation of UAVs for Military and Civil Applications, VKI, Belgium, Sep. 13-17, 1999.
17. Nagel, A., Levy, D. E. and Shepshelovich, M., "Conceptual Aerodynamic Evaluation of MINI/MICRO UAV,"

AIAA Paper 2006-1261, 44th Aerospace Sciences Meeting and Exhibit, 9-12 Jan. 2006, Reno, Nev., 2006.
18. Roth, J. R., Sherman, D. and Wilkinson, S., "Boundary Layer Flow Control with One Atmosphere Uniform Glow Discharge Surface Plasma," AIAA 1998-0328, 1998.
19. Weier, T. and Gerbeth, G., "Control of separated flows by time periodic Lorentz forces," European Journal of Mechanics, B/Fluids, Vol. 23, 2004, pp. 835-849.
20. White. K. "The Skycar: Transportation of the Future," CAMP InSight Magazine, December Issue, 2006, pp. 10-14.
21. Yoeli, R., "Ducted Fan Utility Vehicles and Other Flying Cars," AIAA Paper 2002-5995, Biennial International Powered Lift Conference and Exhibit, Williamsburg, Va., Nov. 5-7, 2002.

SUMMARY OF THE INVENTION

The present invention relates to enhancing aerodynamic performance by using plasma actuators to control air flow. The invention has specific application to fan and ducted-fan performance and flow control at low Reynolds numbers. Dielectric barrier discharge plasma actuators are preferably used.

Recent experiments performed on a variety of airfoil shapes by the inventors, demonstrated a dramatic effect of lightweight Dielectric Barrier Discharge (DBD) plasma actuators on performance at very low Reynolds numbers (3,000<Re<75,000). The actuators were driven in a high frequency (kHz) "steady" mode and a pulsed mode where pulse frequencies and duty cycles were varied in a systematic fashion. Optimum reduced frequencies for generating maximum forces across the airfoil, in the presence of separated flow, were typically between 0.4 and 0.6 and significant performance improvements were achieved at low power (several milliwatts/cm). Moreover, profound differences in the response to reduced frequency and duty cycle were observed for the different airfoil shapes tested.

Given the fact that micro-scale fan blade performance suffers directly as a result of boundary layer separation, DBD plasma actuation emerges as a strong candidate to affect control. Indeed, the demonstration of control on open airfoils at Re<75,000, combined with their light weight and low power operation renders them ideal for open or ducted fan applications. For a micro air vehicle propulsor, this would result in the generation of sufficient thrust for flight, or more efficient use of onboard fuel or battery power. For a computer fan, this would result in greater CFM at the same power or alternatively, the same CFM at significantly lower power.

Therefore, there is clearly a need for, and it would be highly advantageous to have, a fan or ducted fan whose flow field is controlled by dielectric barrier discharge plasma actuators.

Fans are widely used for personal, industrial and automotive cooling, ventilation, vacuuming and dust removal, inflating, etc. Ducted, or shrouded, fans have for many years been the propulsors for airboats, air-cushion vehicles, airships and model aircraft. They are also touted as the primarily propulsive system for so-called personal air vehicles, a number of which are under intense development (e.g. White, 2006; and Yoeli, 2002—see attached disclosure). Their main advantages are high static thrust and propulsion efficiency, while the duct acts to reduce blade noise and improve safety. In recent years, ducted fans have received renewed attention, particularly for the propulsion of small-scale (typically ~500 mm) unmanned air vehicles (Fleming et al, 2003; Guerrero et al, 2003—see attached disclosure). Nevertheless, there is at present a strong trend toward the design of even smaller air vehicles, known as "micro air vehicles" (MAVs; maximum dimension typically between 7.5 cm and 15 cm), for a variety of military and civil applications. One consequence of these smaller scales and relatively low tip speeds is a reduced fan blade Reynolds number, typically less than 50,000. At these Reynolds numbers, boundary layer transition does not occur and the boundary layer is susceptible to separation, which can result in a catastrophic loss of propulsion. The best performing blade profiles are thin, curved sections which do not produce a large pressure differential across the disk since leading-edge separation occurs at relatively low inflow angles.

Another application of fans and ducted fans at these length and velocity scales is their ubiquitous use for the cooling of modern high-speed computer chips, motherboards and power supplies. The efficacy of these fans is often quantified as the ratio of CFM to power input in Watts. Typically, a fan blows air across a heat-sink that is attached to a particular component, such as a CPU. In modern designs, fan speed can be controlled based on a feedback principle and this is generally referred to as active cooling. However, modern high-speed processors require continuously greater cooling and this is generally accomplished using larger heat sinks and more powerful fans running at higher rpm. Apart from physical size limitations, these fans are increasingly noisy and require greater input power. In fact, the noise generated by fans that are used to cool high-end processors, particularly within a small physical computer sizes, is often objectionable to the user.

The current invention offer an industrial fan implementing an innovative technology, which reduces power consumption up to 50% comparing to standard fans, and achieves a decrease of around 75% in noise level. Power consumption percentage of industrial fans is significant (especially in the fields of chemical manufacturing, paper manufacturing, petroleum and coal products manufacturing, as well as additional fields).

The current invention provides significant performance improvements or significant energy savings for these applications: personal, industrial and automotive cooling, ventilation, vacuuming and dust removal, inflating, etc. Computer component cooling, propulsors for unmanned and manned air vehicles, propulsors for airboats, air-cushion vehicles, airships and model aircraft.

Using DBD plasma actuators provides a way of introducing active flow control effectors into thin fan blades.

A paper entitled "Dielectric Barrier Discharge Flow Control at Very Low Flight Reynolds Numbers" to David Greenblatt, Berkant Göksel, Ingo Rechenberg; Chan Yong Schüle, Daniel Romann, and Christian O. Paschereit; published in AIAA JOURNAL Vol. 46, No. 6, June 2008 discloses results from experiments that were performed on a flat-plate airfoil and an Eppler E338 airfoil at low flight Reynolds numbers (Re<140,000), in which dielectric barrier discharge plasma actuators were employed at the airfoil leading edges to effect flow control. The actuators were driven in a high-frequency (kilohertz) steady mode and a pulsed voltage mode in which pulse frequency and duty cycle were varied in a systematic fashion. Optimum reduced frequencies ($F^+$) for generating poststall lift were approximately between 0.2 and 2, and this was broadly consistent with zero-mass-flux slot-blowing data acquired at Reynolds numbers that were approximately 200 times higher. $F^+$ is defined as the product of the pulsed frequency and distance from the actuator to the trailing edge of the wing (or blade) divided by the relative blade velocity. Nevertheless, profound differences in the response to reduced frequency and duty cycle were observed between the flat-plate and E338 airfoils. In general, actuation produced considerable performance improvements, including an increase in maximum lift coefficient of 0.4 to 0.8 and maintained elevated endurance at significantly higher lift coefficients. Actuation in the steady mode resulted in circulation control at Re=3000. Pulsed actuation also exerted a significant effect on the wake at prestall angles of attack, in which control of the upper-surface flat-plate bubble shedding produced significant differences in wake spreading and vortex shedding. The flat plate was also tested in a semispan-wing configuration (AR=6), and the effect of control was comparable with that observed on the airfoil.

The above discussion essentially demonstrated the concept at Reynolds numbers less than 140,000. However, increases in applied voltage to the actuators can render them applicable to much higher Reynolds numbers. In fact performance of the entire range of industrial fans, from the smallest to the largest can be significantly improved using DBD plasma actuators. The largest industrial fans have typical Reynolds numbers of several million, and it can be concluded that DBD plasma actuators can be applied from the extremely low to the intermediate Reynolds number range.

Accordingly, it is an aspect of the invention to provide a fan comprising: at least one fan blade; and at least one plasma actuator mounted on said fan blade.

In some embodiments the plasma actuator is dielectric barrier discharge plasma actuator.

In some embodiments the plasma actuator is driven in pulsed mode.

In some embodiments pulsing of said plasma actuator is at a reduced frequency between 0.2 and 2.

In some embodiments pulsing of said plasma actuator is at duty cycle of 1 to 25 percent.

In some embodiments the fan is an axial fan.

In some embodiments the fan further comprising a shroud around said at least one fan blade.

In some embodiments the fan is a centrifugal fan.

In some embodiments the dielectric barrier in said dielectric barrier discharge plasma actuator comprises a dielectric selected from a group comprising: Mylar; polyimide; Teflon; kapton; and quartz.

In some embodiments at least two rows of plasma actuator are mounted on said fan blade.

In some embodiments the fan blade further comprises a flap.

In some embodiments the flap is an upper surface leading edge device.

In some embodiments the flap is an upper surface trailing edge device.

In some embodiments the flap is a lower surface trailing edge device.

In some embodiments the fan further comprises power transmitter providing electrical energy to said plasma actuator mounted on said fan blade.

In some embodiments the fan further comprising plasma controller controlling said transmitted electrical power.

It is another aspect of the invention to provide a method for enhancing performance of a rotating wing system comprising the steps of: providing electrical power to the rotating part of said rotating wing system; and actuating plasma actuators installed on said rotating wings.

In some embodiments the method further comprises the step of controlling said electrical power provided to said rotating wings system.

In some embodiments the step of controlling said electrical power provided to said rotating wings system comprises switching electrical power among plurality of plasma actuators mounted on plurality of rotating wings.

In some embodiments the method further comprises step of controlling said electrical power provided to said rotating wings system comprises converting said provided electrical power to high voltage RF signal.

Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. In case of conflict, the patent specification, including definitions, will control. In addition, the materials, methods, and examples are illustrative only and not intended to be limiting.

BRIEF DESCRIPTION OF THE DRAWINGS

The invention is herein described, by way of example only, with reference to the accompanying drawings. With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings.

DESCRIPTION OF THE PREFERRED EMBODIMENTS

Figure 1:
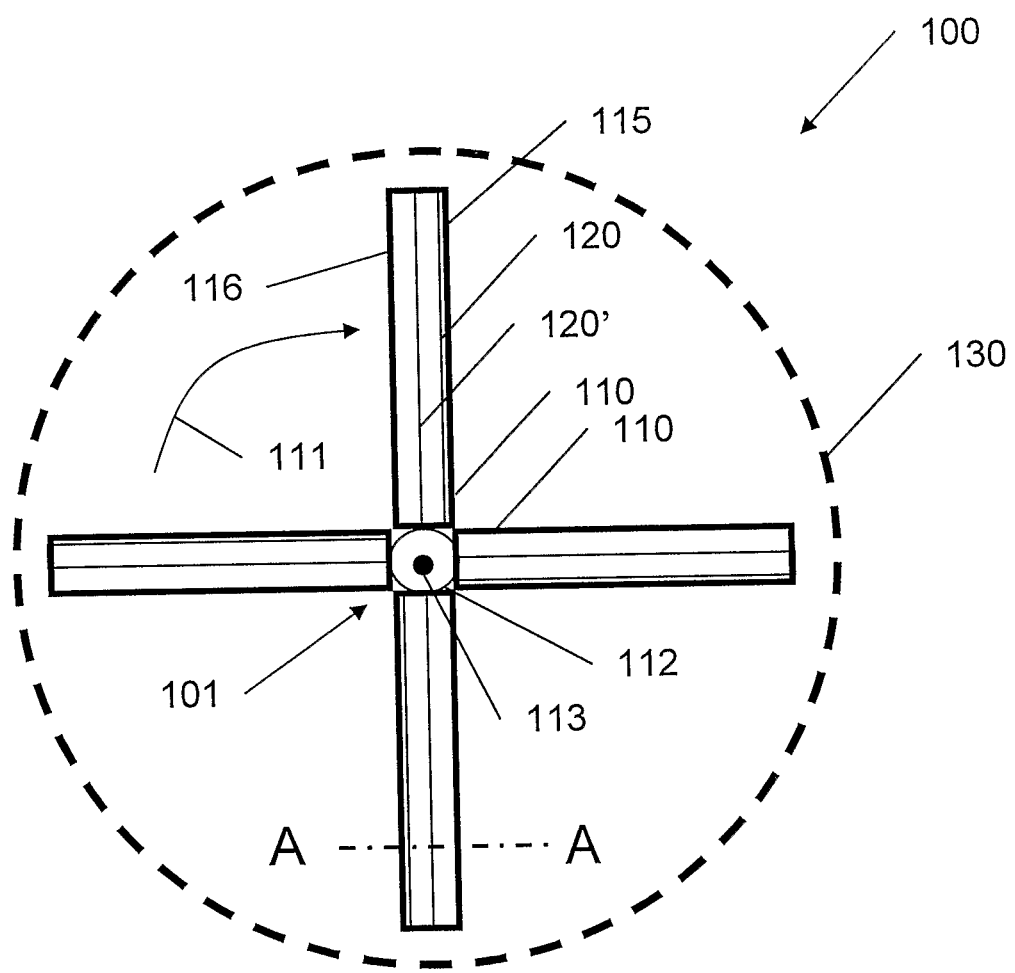
FIG. 1 schematically depicts fan system according to an exemplary embodiment of the current invention.

The present invention relates to enhancing aerodynamic performance by using plasma actuators to control air flow. The invention has specific application to fan and ducted-fan performance and flow control at low Reynolds numbers. Dielectric barrier discharge plasma actuators are preferably used.

Before explaining at least one embodiment of the invention in detail, it is to be understood that the invention is not limited in its application to the details of construction and the arrangement of the components set forth in the following description or illustrated in the drawings. The invention is capable of other embodiments or of being practiced or carried out in various ways. Also, it is to be understood that the phraseology and terminology employed herein is for the purpose of description and should not be regarded as limiting.

The drawings are generally not to scale.

For clarity, non-essential elements were omitted from some of the drawings.

As used herein, an element or step recited in the singular and proceeded with the word "a" or "an" should be understood as not excluding plural elements or steps, unless such exclusion is explicitly recited.

Axial Fan Application

The present invention will be described with respect to axial fans, but it is equally applicable to radial (centrifugal) and cross-flow fans, and these latter two will be described below.

FIG. 1 schematically depicts fan system 100 according to an exemplary embodiment of the current invention.

Fan system 100 comprises fan 101 having fan blades 110 rotating in direction 111 about hub 112.

For clarity only two of the blades are marked. In this figure four identical, symmetrically positioned blades are seen. However it should be noted that number of blades may vary, for example 2, 3, 5 or more blades may be used. Optionally, unequal shaped blades may be used, however preferably fan system 100 is balanced in respect to its center of rotation 113.

Optional duct (shroud) 130 may be placed around fan 101.

Plasma actuators 120 are installed on at least one of blades 110. In the depicted exemplary embodiment, two plasma actuators 120 and 120' are installed along each blade 110. First plasma actuator 120 is installed near the leading edge 115 of blade 110. A second plasma actuator 120' is installed between leading edge 115 and trailing edge 116 of blade 110. However, as will be shown later, the number and location of plasma actuators may be different.

Consider the open or shrouded axial fans shown in FIG. 1. For the purposes of this description, both open and ducted fan are identical apart from the duct 130 that is shown in FIG. 1. Therefore discussion of the open fan and its components described with respect to FIG. 1, apply equally to both. The basic fan shown in FIG. 1 consists of a hub to which four blades are attached. Naturally, there can be anything from 1 to several tens or hundreds of blades. The fan is driven by a motor (not shown) that causes it to rotate in a clockwise direction. The blades are shown to have a constant chord length (c), but in general this could vary along the span of the blade. For the fan as shown in the figure, air or the particular working fluid will be caused to flow away from the reader (into the page).

The cross-sectional profile of the fan blade can have a variety of generic shapes depending on the application. A number of typical examples of blade profile shapes, indicated by A-A in FIG. 1, are shown in FIGS. 2a-2d, namely a straight blade, a curved blade, a flapped blade, complex blade profile with deployable devices, respectively.

It should be noted that profile of the blade may change along the length of the blade. Similarly, location of actuator(s) may change along the length of the blade. As the relative air speed and direction changes along the length of a blade, blade profile and plasma actuation may be adopted to the changing air flow conditions along the blade.

For fans operated at different rotational speeds, the blade attack angle may be changed to adapt to the different rotational speeds. Similarly, actuation mode of plasma actuators 120 may be changed to adapt to different rotational speeds. Additionally or alternatively, different plasma actuators may be operated (or not operated) depending on rotational speed. Specifically, different plasma actuators may optionally be operated (or not operated) depending on rotational direction when the fan direction is reversed to create reverse thrust.

Plasma actuators, for example DBD plasma actuators, are placed at various locations on the blades, for example between the leading-edge and the trailing-edge. The blade can have one actuator, as shown in FIG. 2a; it can have a multitude of actuators as shown in FIG. 2b; it can have two actuators—one at the leading-edge and the other at a bend as shown in FIG. 2c; or it can have multiple actuators that are used in combination with leading- and trailing-edge devices as shown in FIG. 3.

Figure 2A:
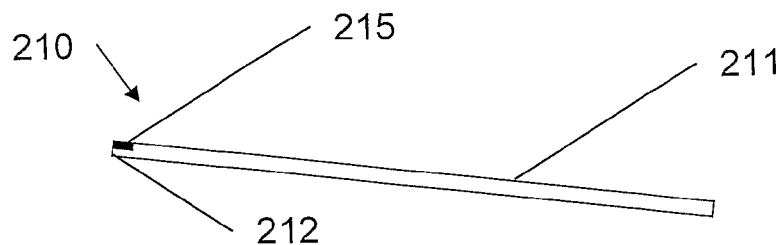
FIG. 2a schematically depicts a profile of straight blade according to an exemplary embodiment of the current invention.

FIG. 2a schematically depicts a profile of straight blade 210 according to an exemplary embodiment of the current invention.

Straight blade 210 comprises a thin straight blade structure 211 and a plasma actuator 215 installed at leading edge 212 of blade 210.

Figure 2B:
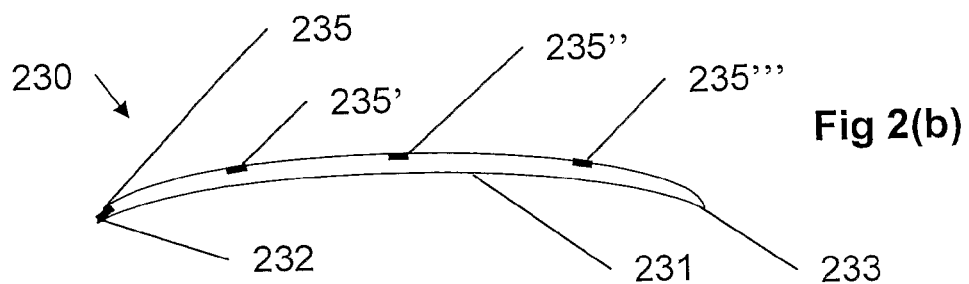
FIG. 2b schematically depicts a profile of curved blade according to an exemplary embodiment of the current invention.
Figure 2C:
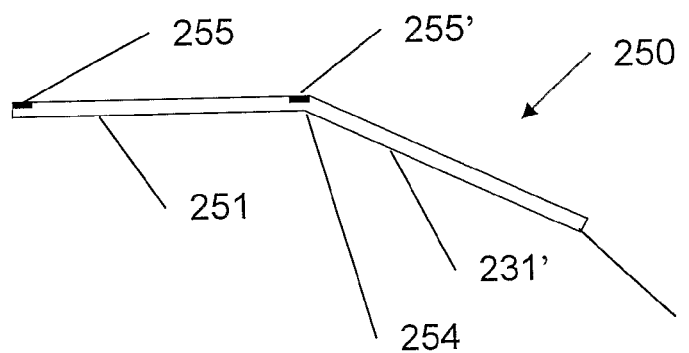
FIG. 2c schematically depicts a profile of flapped blade according to an exemplary embodiment of the current invention.

FIG. 2b schematically depicts a profile of curved blade 230 according to an exemplary embodiment of the current invention.

Curved blade 230 comprises a thin curved blade structure 231 and a plasma actuator 235 installed at leading edge 232 of blade 230.

Additionally, curved blade 230 comprises plasma actuators 235', 235" and 235''' installed on upper surface of blade 230 between leading edge 232 and trailing edge 233.

FIG. 2c schematically depicts a profile of flapped blade 250 according to an exemplary embodiment of the current invention.

Flapped blade 250 comprises a thin flapped blade structure comprising front section 251 and rear section 251' constructed a higher attack angle.

Flapped blade 250 additionally comprises a plasma actuator 255 installed at leading edge 252 of blade 250.

Additionally, curved blade 230 comprises plasma actuator 235' installed on upper surface of blade 250 between leading edge 252 and trailing edge 253, preferably near joint 254 of front section 251 and rear section 251'.

Figure 2D:
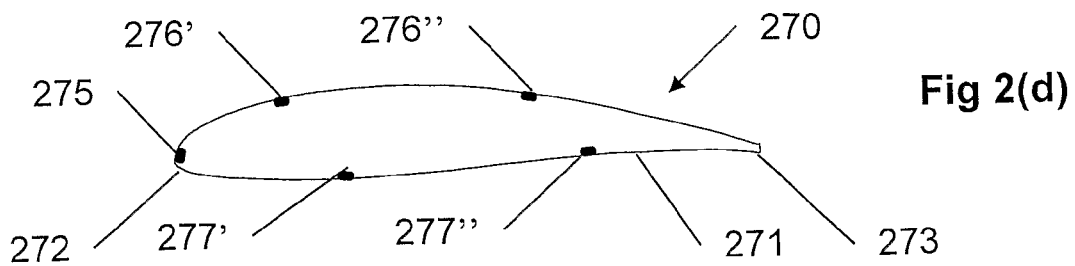
FIG. 2d schematically depicts a profile of thick blade according to an exemplary embodiment of the current invention.

FIG. 2d schematically depicts a profile of thick blade 270 according to an exemplary embodiment of the current invention.

Thick blade 270 comprises an aerodynamically shaped blade structure 271.

Thick blade 270 additionally comprises a plasma actuator 275 installed at leading edge 272 of blade 270.

Additionally, thick blade 270 comprises plasma actuators 276' and 276" installed on upper surface of blade 270 between leading edge 272 and trailing edge 273 of blade 270.

Additionally, thick blade 270 comprises plasma actuators 277' and 277" installed on lower surface of blade 270 between leading edge 272 and trailing edge 273 of blade 270.

Figure 3A:
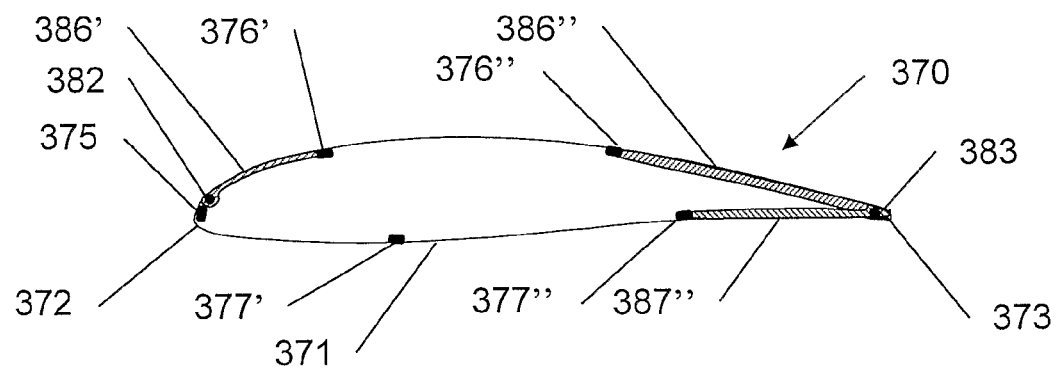
FIG. 3a schematically depicts a profile of complex blade according to an exemplary embodiment of the current invention.

FIG. 3a schematically depicts a profile of complex blade 370 according to an exemplary embodiment of the current invention.

Complex blade 370 comprises an aerodynamically shaped blade structure 371.

Complex blade 370 additionally comprises a plasma actuator 375 installed at leading edge 372 of blade 370.

Additionally, complex blade 370 may comprise a plasma actuator 376' installed on Upper Surface Leading Edge Device (USLED) 386' attached to leading edge 372 of blade 270 using front hinge 382.

Additionally, complex blade 370 may comprise a plasma actuator 376" installed on Upper Surface Trailing Edge Device (USTED) 386" attached to trailing edge 373 of blade 270 using back hinge 383.

Additionally, complex blade 370 may comprise a plasma actuator 377" installed on Lower Surface Trailing Edge Device (LSTED) 387" attached to trailing edge 373 of blade 270 using back hinge 383.

Additionally, complex blade 370 may comprise a plasma actuator 377' installed to lower surface of blade 371 between leading edge 372 and LSTED 387".

It should be noted that USLED 386', USTED 386" and LSTED 387" are depicted in FIG. 3a in un-deployed configuration. Optionally, more upper or lower surface devices may be used and may use same or separate hinges. The exact shape, location and size of devices may also vary. Specifically, additional plasma actuators may be added.

Figure 3B:
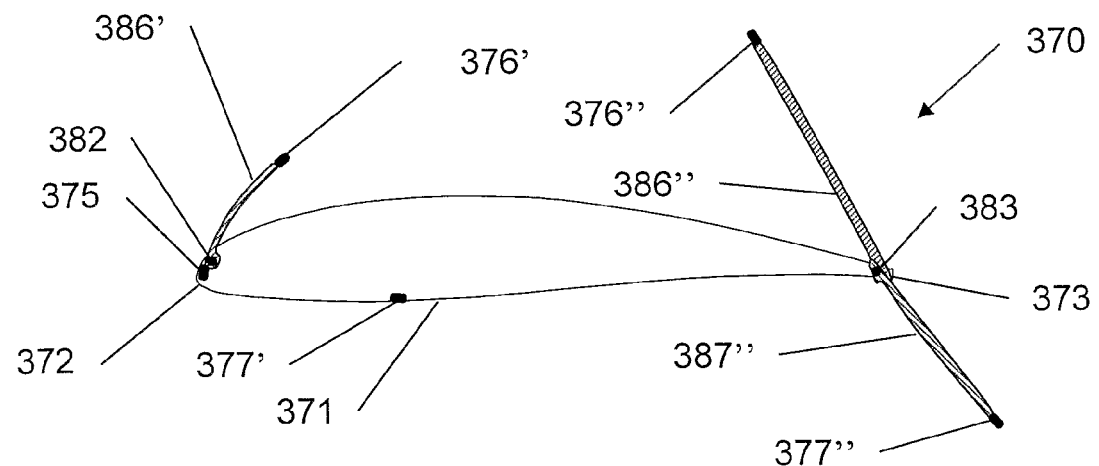
FIG. 3b schematically depicts a profile of complex blade with deployed devices according to an exemplary embodiment of the current invention.

FIG. 3b schematically depicts a profile of complex blade 370 with deployed devices according to an exemplary embodiment of the current invention. In this figure all of USLED 386', USTED 386" and LSTED 387" are depicted in deployed state. It should be noted that optionally only some of USLED 386', USTED 386" and LSTED 387" are deployed. Preferably, plasma actuators such as 376', 376" and 377" are in operation while the corresponding device is deployed.

It should be noted the deployment angle may vary according to the operational condition such as air speed and attack angle.

Figure 4A:
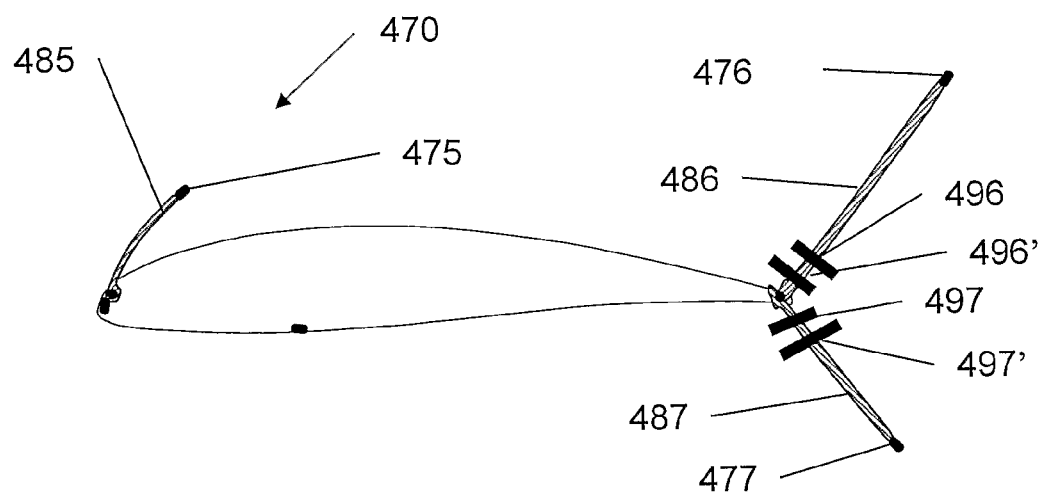
FIG. 4a schematically depicts a profile of complex blade having permeable trailing edge devices, in deployed state according to an exemplary embodiment of the current invention.

FIG. 4a schematically depicts a profile of complex blade 470 having permeable trailing edge devices, in deployed state according to an exemplary embodiment of the current invention.

Complex blade 470 has similar construction to blade 370. For clarity, some parts were omitted or left un-marked in this figure.

Complex blade 470 may comprise a plasma actuator 475 installed on Upper Surface Leading Edge Device (USLED) 475 attached to leading edge 372 of blade 270 using front hinge. In this figure, perforated USLED 475 is shown deployed.

In this figure, perforated USTED 486 is shown deployed in acute angle to air velocity vector.

In contrast to devices 386", perforated USTED 486 is preferably constructed with air openings 496, 496'.

Similarly, perforated LSTED 487 is preferably constructed with air openings 497, 497'.

It should be noted that number of the openings, their size and shape may vary.

Figure 4B:
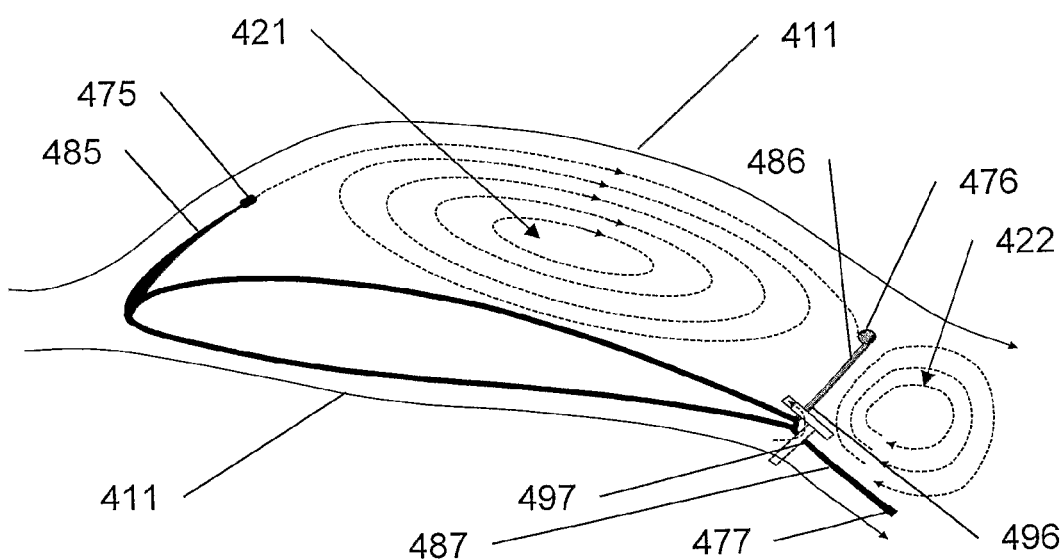
FIG. 4b schematically depicts a profile of complex blade having permeable trailing edge devices, in deployed state according to an exemplary embodiment of the current invention, showing the air flow around said blade.

FIG. 4b schematically depicts a profile of complex blade having permeable trailing edge devices, in deployed state according to an exemplary embodiment of the current invention, showing the air flow around said blade.

Perforated USTED 486 is shown with an air opening 496. Similarly, perforated LSTED 487 is shown with air opening 497.

Air flow direction is depicted by arrowed curves 411.

Trapped vortices are depicted by arrowed loops 421 and 422.

When the leading-edge (LE) and trailing-edge (TE) devices are not deployed, the blade profile resembles that shown in FIG. 2d. A variety of possible configurations are shown in FIGS. 3 and 4. These are by no means exhaustive, but serve to illustrate possible configurations:

Deployment of the LED alone;
Deployment of the USTED alone;
Deployment of the LED and USSTED;
All devices deployed 6.

As a general rule these devices need not be solid and can be permeable, i.e. they may also have slots within them to allow air to partially flow through them, as shown on the trailing-edge devices of FIG. 4. Once the devices are deployed, any number of plasma actuators can be activated in order to (a) maximize the lift force; (b) minimize the drag force; or (c) maximize the aerodynamic efficiency of the (lift force/drag force).

One example of how the invention works can be seen with respect to FIG. 4b, based on the example shown in FIG. 4a. In this configuration, a very large and powerful vortex 421 is "trapped" on the upper surface of the blade. This has two effects: (i) the low pressure produces very high lift; (ii) the reverse flow produced so-called skin-friction thrust, thereby reducing drag. A second vortex 422 is trapped aft of the blade further increasing lift and reducing drag.

The Dielectric Barrier Discharge Actuator

Figure 5:
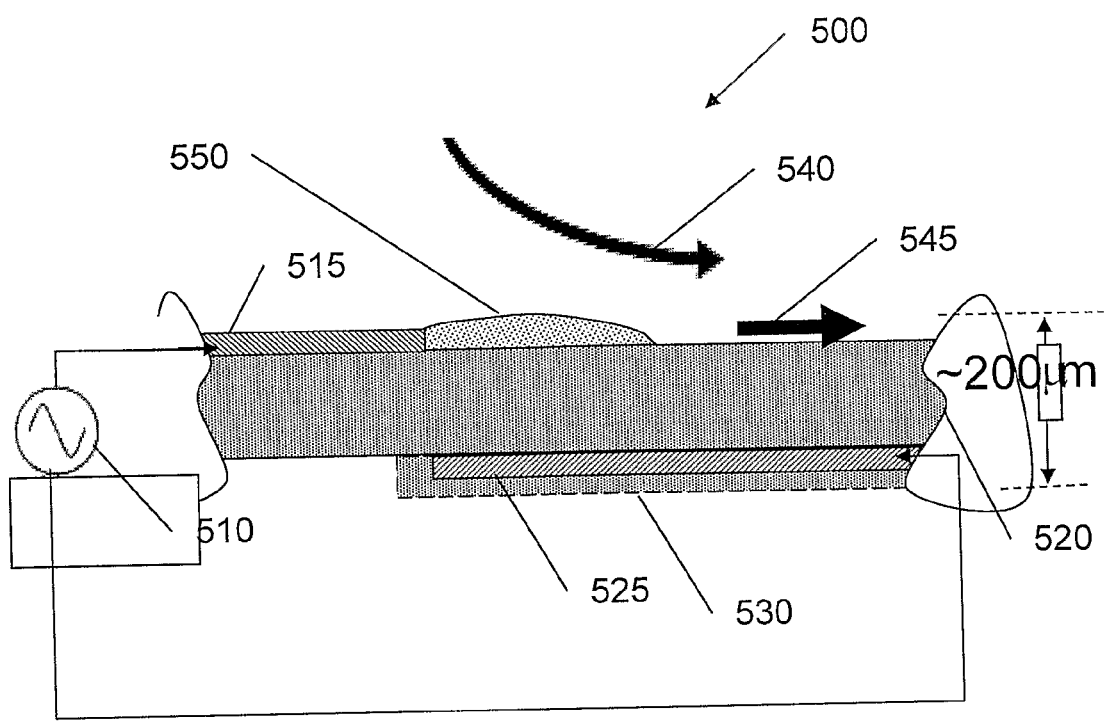
FIG. 5 schematically depicts construction of a Dielectric Barrier Discharge (DBD) plasma actuator according to an exemplary embodiment of the current invention.

FIG. 5 schematically depicts construction of a Dielectric Barrier Discharge (DBD) plasma actuator 500 according to an exemplary embodiment of the current invention.

RF high power supply 510, supplying alternating high voltage is connected to air exposed electrode 515 and insulated electrode 525 which are separated by thin dielectric layer 520. Optional insulation layer 530 insulating insulated electrode 525 from its environment. However, when DBD 500 is attached to a structure such as a fan blade made of electrically insulating material, the blade may serve as insulation layer 530.

RF plasma 550 is generated in the location where air exposed electrode 515 and insulated electrode 525 are in proximity to each other. Gas discharge is created when an electric field of sufficient amplitude is applied to a volume of gas to generate electron-ion pairs through electron impact ionization of the neutral gas [7-10]. 545 is the air jet (or gas jet) produced by the plasma actuator. 540 is the induced flow of air resulting from the air jet. Generation of the air jet as a result of the plasma produces momentum as any jet would in the direction 545. This results in the creation of a net thrust by Newton's third law of motion.

Figure 6:
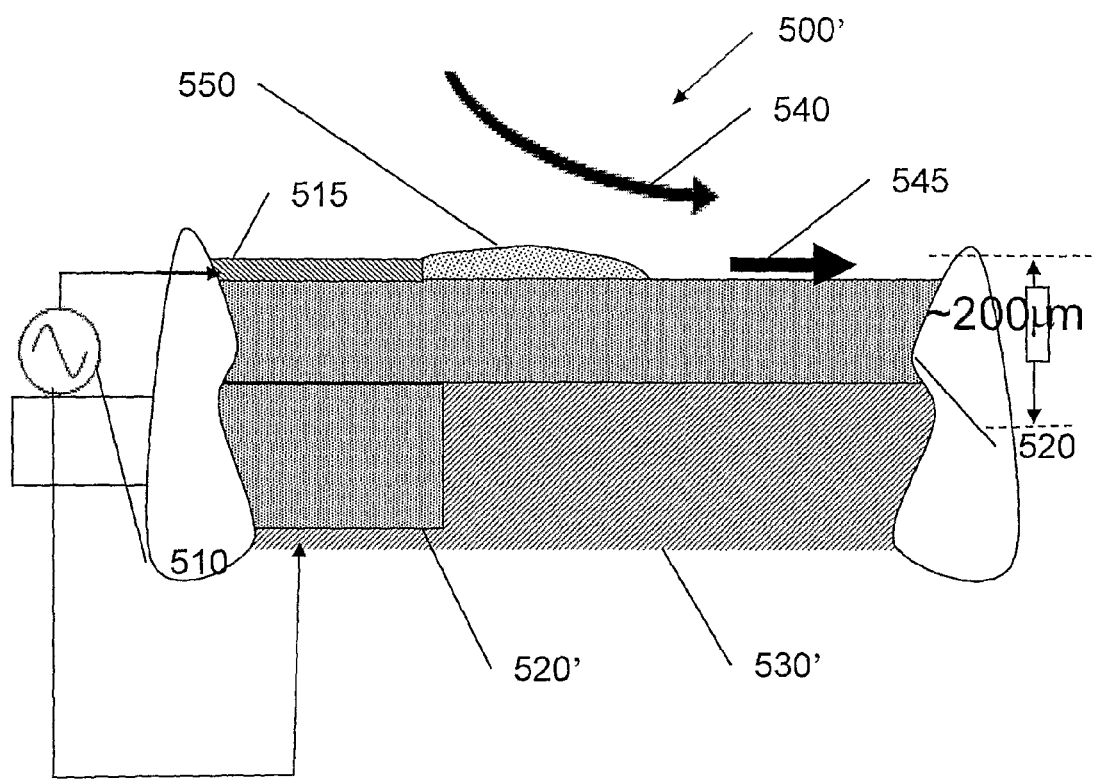
FIG. 6 schematically depicts construction of a Dielectric Barrier Discharge (DBD) plasma actuator according to an exemplary embodiment of the current invention.

FIG. 6 schematically depicts construction of a Dielectric Barrier Discharge (DBD) plasma actuator 500' according to an exemplary embodiment of the current invention.

RF high power supply 510, supplying alternating high voltage is connected to air exposed electrode 515 and to the blade structure 525' acting as insulated electrode. Air exposed electrode 515 and blade structure 525' are separated by thin dielectric layer 520 at the location where RF plasma 550 is to be created, but separated by thick insulating layer 520' elsewhere.

Kempton film may be used as dielectric layer. Alternatively, other insulators such as Mylar or polyimide may be used.

The DBD actuators used in the demonstration of the invention had an asymmetric arrangement, consisting of two thin metal electrodes separated by a thin dielectric layer (see FIG. 5). In the experimental system, the structure's thickness was approximately $200*10^{-6}$ m, however other thickness may be used. Sufficiently high voltages, at "carrier" frequencies $f_c$ between approximately 3 kHz and 10 kHz, are supplied to the actuator and cause the air to weakly ionize at the edges of the upper electrode. It should be noted that higher or lower frequency may be used according to embodiments of the invention.

These are regions of high electric field potential and in an asymmetric configuration, such as that shown in the figure; plasma is only generated at one edge. The plasma moves to regions of increasing electric field gradients and induces a 2-D wall jet in the flow direction 540 along the surface, thereby adding momentum to the boundary layer.

In some embodiments, the high voltage is supplied continuously, in other embodiments; the high voltage is switched on and off or is otherwise modulated. Specifically, in some preferred embodiments, the high voltage was modulated as a train of high frequency square pulses at a characteristic frequency and with a specific duty cycle.

It should be noted that using pulsed RF power at low duty cycle may save energy while maintaining reasonable performance. Power saving is useful, but it may be critical in applications were limited power is available such as in UAVs. In fan applications, power switching among plurality of actuators on the plurality of blades may be done by a controller at the fan's hub. Such power switching may reduce the instantaneous power transmission into the rotor to the average power used by the totality of the actuator without the need for power storage at the rotor.

It is pointed out that the DBD actuators are merely one type of plasma-based actuator and it is referenced for purposes of illustration only.

Application to Centrifugal and Crossflow Fans

Figure 7:
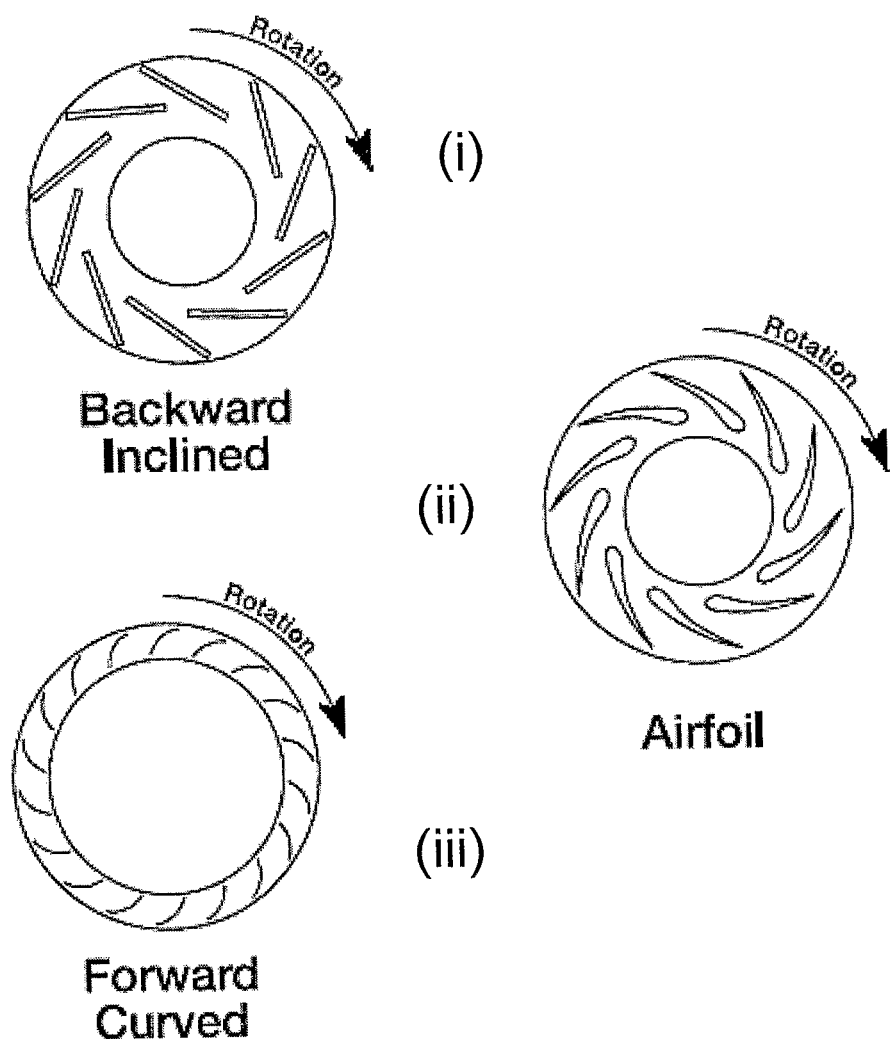
FIG. 7 schematically depicts top views of several radial blowers according to exemplary embodiments of the current invention.

FIG. 7 schematically depicts top views of several radial blowers according to exemplary embodiments of the current invention.

The description in the above section is relevant to axial fans specifically. However, the same concept may be applied to centrifugal fans (sometimes called radial blowers) and crossflow fans. Consider the impellers of two typical centrifugal fans, i.e. with backward inclined (FIG. 7(*i*)) and airfoil type vanes (FIG. 7(*ii*)), and the impeller of a crossflow fan, with forward curved vanes (FIG. 7(*iii*)). Clearly, the backward inclined blade profiles correspond to that shown in FIG. 2*a*. In a conventional centrifugal fan no DBD active flow control is applied. In this invention, DBD plasma actuation is applied at either or both of the edges of the impeller profile. A similar correspondence exists between the centrifugal fan airfoil type profile and that shown in FIG. 2*d*, and the forward curved profile and that shown in FIG. 2*b*. It is thus clear that the DBD plasma control of axial flow fan flows described herein may apply equally well to the centrifugal and crossflow fan vanes described here.

Figure 8:
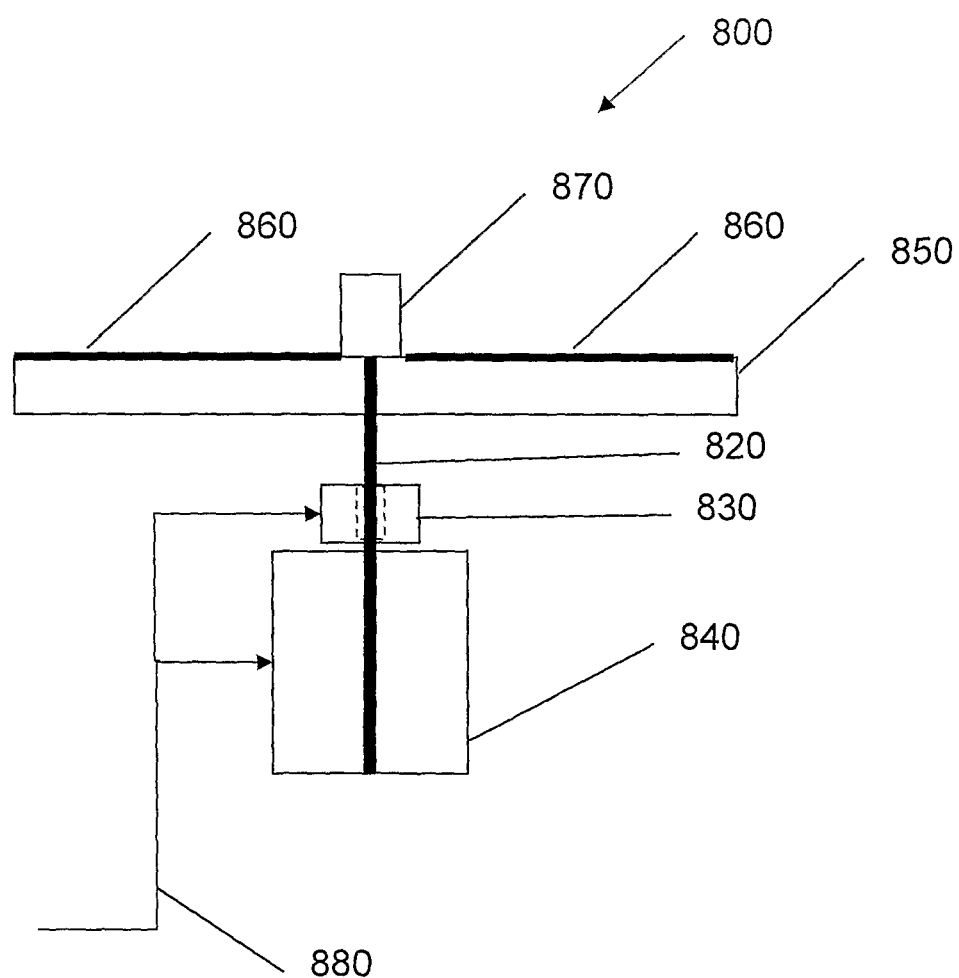
FIG. 8 schematically depicts fan system according to an exemplary embodiment of the current invention.

FIG. 8 schematically depicts fan system 800 according to an exemplary embodiment of the current invention.

Fan system 800 comprises an electrical motor 840 connected to plurality of fan wings 850 by axis 820. Power cord 880 supplies main electrical power to motor 840 and to power transmitter 830. Power transmitter 830 transmits electrical power to the rotating parts of fan system 800 using one of the abovementioned methods. Optional plasma controller 870 converts electrical power received from transmitter 830 to RF electrical signals and activate the plurality of plasma actuators 860 installed on fan wings 850.

In all applications, electrical power needs to be supplied to the plasma actuators. In embodiments such as airplane wings or control surfaces, electrical power supply may be places within the fuselage or the wing and connected to the actuators.

In applications such as fans and other rotating structure, electrical power may be transferred from the stationary structure to the rotating parts by conduction, for example by using slip-ring.

Alternatively, electrical power may be transferred from the stationary structure to the rotating parts by induction or by microwave radiation. For example, an electrical transformer may be used for transferring electrical energy from the fan's stationary part to the rotating parts having: a stationary primary coil, attached to the fan stator and wound around the rotation axis receiving AC electrical power from main electrical grid of from a local power supply; and a secondary coil, electromagnetically coupled to said primary coil mounted on and rotating with the rotating part of the fan.

Alternatively, brushes used for transferring electrical energy to the rotor of the motor used for rotating the fan may be used also for supplying electrical energy to plasma actuators. Optionally, dedicated brushes may be used. Alternatively, in a brushless motor, induced electrical currents created in the rotor of the motor may be used for supplying electrical energy to plasma actuators.

In some embodiments, high frequency RF power is inductively or capacitively transferred from the stationary structure to the rotating parts at the carrier frequency used by the plasma actuator(s).

Power may be generated in the rotating part by placing magnets on the stator and having a coil or coils in the rotor.

Optionally, electrical power is conditioned in the rotor, for example is frequency is changed or its voltage changed or regulated or modulated before it is supplied to the actuator(s). Optionally a plasma controller mounted on the rotor regulates the distribution of electrical power to the plasma actuators.

Other Applications

It is well known that a fan (or wind pump) can also be used as a turbine. The most common of these is the horizontal axis (axial flow) wind turbine, where wind turns the turbine blades that, in turn, drive a generator. Thus, it is conceivable that DBD plasma actuators could be used on wind turbines in order to improve performance and control the flow separation phenomenon known as dynamic stall (see Carr, 1988).

Another application of the invention is for Micro Air Vehicles (MAVs) and Nano Air Vehicles (NAVs) and other Unmanned small Air Vehicles (UAV). Providing lift pose significant challenges due to their small dimensions and low flight speeds. For so-called mini air vehicles, which operate in the 10,000<Re<300,000 range, efficient systems can be designed by using plasma actuators. The challenge of developing useful lift intensifies with yet smaller vehicles required to fly at even lower flight speeds. This includes the development of so-called nano UAVs for which the missions include flying within confined areas. These are commonly termed nano air vehicles (NAVs) and are defined as weighing less than 10 g, with dimensions smaller than 7:5 cm, and speeds between 0.5 and 7:5 m/s. Propulsion systems used in these UAVs are usually (optionally electrically powered) propellers. In these applications, high efficiency lift and propulsion systems directly translates to one or few of: longer flight duration, higher payload, higher speed and/or higher maneuverability.

Finally, all of the above examples referred to airflows. However, similar applications can be found in liquid applications, particularly when the liquids are conductive or even weakly conductive such as in seawater. In these instances, plasma actuation would not be used, but control could be affected using Lorentz force type actuators of the design described by Weier et al (2004).

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub combination.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims. All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention.

The invention claimed is:

1. A fan system comprising:
   at least one fan blade; and
   at least one plasma actuator mounted on said at least one fan blade, wherein the plasma actuator is a dielectric barrier discharge plasma actuator;
   wherein the plasma actuator is driven in pulsed mode and pulsing of said plasma actuator is at a reduced frequency F+ between 0.2 and 2, wherein F+ is defined as the product of the pulsed frequency and of the distance from the actuator to a trailing edge of the fan blade, and divided by the relative blade velocity.

2. The fan system of claim 1, wherein the pulsing of said at least one plasma actuator is at duty cycle of 1 to 25 percent.

3. The fan system of claim 1, further comprising a shroud around said at least one fan blade.

4. The fan system of claim 1, wherein the fan blades form a centrifugal fan.

5. The fan system of claim 1, wherein dielectric barrier in said dielectric barrier discharge plasma actuator comprises a dielectric barrier selected from a group comprising: Mylar; polyimide; Teflon; kapton; and quartz.

6. The fan system of claim 1, wherein said fan blade further comprises a flap, and wherein the flap is deployable according to the condition of the blade.

7. The fan system of claim 6, wherein said flap is an upper surface leading edge device.

8. The fan system of claim 6, wherein said flap is an upper surface trailing edge device.

9. The fan system of claim 6, wherein said flap is a lower surface trailing edge device.

10. The fan system of claim 1, further comprising power transmitter providing electrical energy to said plasma actuator mounted on said at least one fan blade.

11. The fan system of claim 10, further comprising plasma controller controlling said transmitted electrical power and capable of converting electrical power to RF electrical signals, and wherein said plasma controller is also capable of switching electrical power among a plurality of said plasma actuators.

12. The fan system of claim 11, wherein the plasma controller is capable of controlling activation parameters of plasma actuators selected from a group comprising: the duty cycle of activation of the plurality of plasma actuators; the power supplied to the plurality of plasma actuators; and distribution of electrical power among the plasma actuators.

13. The fan system of claim 11, wherein the fan blade is made of electrically conductive material; and wherein the plasma actuator has an air exposed electrode; and wherein the fan blade is separated from the air exposed electrode by a thin dielectric layer at the location where RF plasma is to be created, but separated by thick insulating layer elsewhere.

14. The fan system of claim 10, wherein the power transmitter uses a power transmitting device selected from a group comprising: a capacitive power; a slip-ring transmitter; brushes transferring power from stator of motor to rotor of motor; magnets attached to the static part of the fan system; and at least one coil attached to the rotating part of the fan system, and a stationary primary coil attached to the static part of the fan system and a secondary coil, electromagnetically coupled to said primary coil mounted on, and rotating with the rotating part of the fan.

15. The fan system of claim 1, wherein said reduced frequency F+ between 0.4 and 0.6.

16. The fan system of claim 1, wherein the plasma actuator is oriented parallel to leading edge of the fan blade.

17. The fan system of claim 1, wherein the plasma actuator is positioned substantially at the leading edge of the fan blade.

18. The fan system of claim 1, wherein the fan blade is operated at Reynolds numbers between 1,000 and 200,000.

19. The fan system of claim 1, wherein at least one blade of the plurality of rotating fan blades comprises at least two plasma actuators located on an upper surface of the blade remotely from a leading edge of blade.

20. The fan system of claim 1, wherein at least one blade of the plurality of rotating fan blades comprises at least one plasma actuator located on a lower surface of the blade remotely from a leading edge of the blade.

21. A method for enhancing performance of a rotating wing system comprising the steps of:
   providing electrical power to a rotating part of said rotating wing system;
   actuating plasma actuators installed on said rotating wings; and
   pulsing said plasma actuators at a reduced frequency F+ between 0.2 and 2;
   wherein the plasma actuators are dielectric barrier discharge plasma actuators, and wherein F+ is defined as the product of the pulsed frequency and of the distance from the actuator to a trailing edge of the fan blade, and divided by the relative blade velocity.

22. The method of claim 21, and further comprising the step of controlling said electrical power provided to said rotating wings system.

23. The method of claim 22, wherein the step of controlling said electrical power provided to said rotating wings system comprises switching electrical power among a plurality of plasma actuators mounted on a plurality of rotating wings.

24. The method of claim 22, wherein the step of controlling said electrical power provided to said rotating wings system comprises converting said provided electrical power to high voltage RF signal.

* * * * *